United States Patent
Greenlee et al.

(10) Patent No.: US 11,015,415 B2
(45) Date of Patent: May 25, 2021

(54) FILAMENT-REINFORCED COMPOSITE MATERIAL WITH LOAD-ALIGNED FILAMENT WINDINGS

(71) Applicant: Nine Downhole Technologies, LLC, Houston, TX (US)

(72) Inventors: Donald Roy Greenlee, Murchison, TX (US); Donald Jonathan Greenlee, Murchison, TX (US); Brian David Oligschlaeger, Aledo, TX (US)

(73) Assignee: Nine Downhole Technologies, LLC, Houston, TX (US)

( * ) Notice: Subject to any disclaimer, the term of this patent is extended or adjusted under 35 U.S.C. 154(b) by 189 days.

(21) Appl. No.: 15/981,592

(22) Filed: May 16, 2018

(65) Prior Publication Data

US 2019/0352999 A1   Nov. 21, 2019

(51) Int. Cl.
*E21B 33/129* (2006.01)
*B65H 54/04* (2006.01)
*B65H 54/71* (2006.01)
*B65H 55/00* (2006.01)

(52) U.S. Cl.
CPC ......... *E21B 33/1293* (2013.01); *B65H 54/04* (2013.01); *B65H 54/71* (2013.01); *B65H 55/00* (2013.01); *E21B 33/129* (2013.01)

(58) Field of Classification Search
CPC ..................................................... E21B 33/129
See application file for complete search history.

(56) References Cited

U.S. PATENT DOCUMENTS

| | | | | |
|---|---|---|---|---|
| 3,433,696 A | * | 3/1969 | Vesta | F16L 9/16 156/425 |
| 3,661,670 A | * | 5/1972 | Pierpont, Jr. | B29C 53/585 156/172 |
| 3,724,386 A | * | 4/1973 | Schmidt | B64G 1/58 244/159.1 |
| 4,236,386 A | * | 12/1980 | Yates | B29C 70/86 138/109 |
| 4,260,332 A | * | 4/1981 | Weingart | F03D 7/0224 416/226 |
| 4,813,715 A | * | 3/1989 | Policelli | F16L 47/041 285/222.2 |
| 4,875,717 A | * | 10/1989 | Policelli | F16L 33/01 285/222.1 |
| 2014/0020911 A1 | * | 1/2014 | Martinez | E21B 23/01 166/387 |

* cited by examiner

*Primary Examiner* — Giovanna Wright
(74) *Attorney, Agent, or Firm* — Vinson & Elkins L.L.P.

(57) ABSTRACT

A filament-reinforced composite material having with load-aligned filament windings enables improvement of mechanical properties for specific loading of parts made from the material. The orientation of the winding within the part may be changed depending on an orientation of an external load to the part. In one example, the part may be a slip in a frac plug or a bridge plug in a downhole application.

16 Claims, 4 Drawing Sheets

FIG. 3 SEGMENTED MANDREL JIG FOR FORMING A LOAD-ALIGNED FILAMENT WINDING

FIG. 4 COMPOSITE SLIP WITH LOAD-ALIGNED FILAMENT WINDING

500 — IMAGE OF SEGMENTED MANDRELS

FIG. 5

600 ⤵  METHOD OF FORMING FILAMENT-REINFORCED COMPOSITE PARTS

602 — ASSEMBLING A PLURALITY OF SEGMENTED MANDRELS ON A BASE TUBE, WHERE EACH OF THE SEGMENTED MANDRELS HAS A SMALL DIAMETER PORTION AT A FIRST END AND A LARGE DIAMETER PORTION AT A SECOND END, AND WHERE EACH SUCCESSIVE SEGMENTED MANDREL IS PLACED ON THE BASE TUBE IN A REVERSED ORIENTATION SUCH THAT THE SMALL DIAMETERS AND THE LARGE DIAMETERS OF ADJACENT SEGMENTED MANDRELS RESPECTIVELY MEET TO FORM A SUBSTANTIALLY CONTIGUOUS OUTER SURFACE

604 — PREPREGNATING A FILAMENT WITH AN EPOXY RESIN

606 — WINDING THE PREPREGNATED FILAMENT OVER THE OUTER SURFACE TO FORM ALTERNATING SMALL DIAMETER PORTIONS AND LARGE DIAMETER PORTIONS CORRESPONDING TO THE SEGMENTED MANDRELS

608 — CUTTING A PLURALITY OF PARTS FROM EACH OF THE CYLINDRICAL PORTIONS, WHERE EACH OF THE PARTS HAS A FIRST ORIENTATION OF THE FILAMENTS AT A FIRST END OF THE PART AND HAS A SECOND ORIENTATION OF THE FILAMENTS AT A SECOND END OF THE PART OPPOSING THE FIRST END, WHERE THE FIRST ORIENTATION AND THE SECOND ORIENTATION RUN AT DIFFERENT ANGLES WITH RESPECT TO AN OUTER SURFACE OF THE PART, SUCH THAT THE FIRST ORIENTATION IS SUBSTANTIALLY PARALLEL WITH THE OUTER SURFACE OF THE PART

FIG. 6

FILAMENT-REINFORCED COMPOSITE MATERIAL WITH LOAD-ALIGNED FILAMENT WINDINGS

BACKGROUND

Field of the Disclosure

The present disclosure relates generally to composite materials and, more particularly, to a filament-reinforced composite material with load-aligned filament windings. The present disclosure also describes a slip made using such a filament-reinforced composite material with load-aligned filament windings for use in a downhole assembly.

Description of the Related Art

Composite materials are known in various applications as a combination of two or more phases that are combined to produce a new material having unique properties. Composite materials are typically formed using a matrix phase that typically refers to a homogenous 'background' material to which at least one inclusion phase is added. The inclusion phase may be particles, fibers, flakes, powder or even a liquid. When the inclusion phase includes fibers, the fibers may be of various lengths from very short fibers to longer, continuous strands of fiber. Such longer, continuous strands of fiber are referred to herein as "filaments".

As the name suggests, the combination of the phases in a composite material may result in composite material with properties that provide one or more improvement over each of the phases individually. For example, a hard inclusion phase added to a relatively soft matrix phase may improve overall wear or toughness properties of the resulting composite material.

Various types of parts for industrial applications may be formed using composite materials. One example of a widely used class of composite materials are fiber-reinforced polymers. For example, fiber-reinforced composite polymer parts may be used as slips for downhole high-pressure applications, such as in a frac plug or in a bridge plug, in which a high strength to failure is desirable.

SUMMARY

In one aspect, a disclosed filament-reinforced composite slip includes a matrix phase comprising a cross-linked polymer, and an inclusion phase comprising filaments having a first orientation at a first end of the slip and having a second orientation at a second end of the slip opposing the first end. In the filament-reinforced composite slip, the first orientation and the second orientation may run at different angles with respect to an outer surface of the slip at the first end. In the filament-reinforced composite slip, the first orientation may be substantially parallel to the outer surface of the slip, while the outer surface of the slip may be enabled to engage an inner surface of a wellbore to secure a downhole assembly in the wellbore.

In any of the disclosed implementations of the filament-reinforced composite slip, the second orientation may be transverse to a loading direction experienced by the slip. In any of the disclosed implementations of the filament-reinforced composite slip, the second orientation may be perpendicular to the loading direction. In any of the disclosed implementations of the filament-reinforced composite slip, the second orientation may be at a defined angle that is not parallel to a loading direction experienced by the slip.

In any of the disclosed implementations of the filament-reinforced composite slip, the downhole assembly may be a frac plug. In any of the disclosed implementations of the filament-reinforced composite slip, the downhole assembly may be a bridge plug.

In any of the disclosed implementations, the filament-reinforced composite slip may further include a transition region in the slip in which the filaments change orientation from the first orientation to the second orientation.

In any of the disclosed implementations of the filament-reinforced composite slip, the second orientation may be defined by an angle $\alpha$ with respect to the outer surface of the slip at the first end.

In any of the disclosed implementations of the filament-reinforced composite slip, a cone in the downhole assembly may engage the slip at a cone angle $\varphi$, while the angle $\alpha$ may be supplementary to the cone angle $\varphi$.

In any of the disclosed implementations, the filament-reinforced composite slip may further include an angled surface at the second end. In the filament-reinforced composite slip, the angled surface may be substantially parallel to the second orientation. In the filament-reinforced composite slip, the cone may engage the slip at least at a portion of the angled surface.

In any of the disclosed implementations of the filament-reinforced composite slip, the cross-linked polymer may include an epoxy resin and the filament may comprise glass.

In any of the disclosed implementations of the filament-reinforced composite slip, a diameter of the filament may be selected to achieve a desired compositional ratio between the matrix phase and the inclusion phase.

In any of the disclosed implementations of the filament-reinforced composite slip, a prepregnation loading of the filament with the cross-linked polymer may be selected to achieve a desired compositional ratio between the matrix phase and the inclusion phase.

In any of the disclosed implementations of the filament-reinforced composite slip, the slip may be cut from a specialized filament wound tube that is wound using a prepregnated filament.

In any of the disclosed implementations of the filament-reinforced composite slip, the prepregnated filament may be wound at an angle $\beta$.

In any of the disclosed implementations of the filament-reinforced composite slip, the filaments in the slip may be under tension.

In yet another aspect, a method of forming filament-reinforced composite slips is disclosed. The method may include assembling a plurality of segmented mandrels on a base tube. In the method, each of the segmented mandrels may have a small diameter portion at a first end and a large diameter portion at a second end, while each successive segmented mandrel may be placed on the base tube in a reversed orientation such that the small diameters and the large diameters of adjacent segmented mandrels respectively meet to form a substantially contiguous outer surface. The method may further include winding a prepregnated filament over the outer surface to form alternating small diameter portions and large diameter portions corresponding to the segmented mandrels.

In any of the disclosed implementations, the method may also include curing the prepregnated filament wound over the segmented mandrels to form a specialized filament wound tube, and radially cutting the specialized filament wound tube at locations where the small diameters and the large diameters of adjacent segmented mandrels respectively meet to create cylindrical portions of filament-reinforced composite material and to release the segmented mandrels. The method may still further include cutting a plurality of slips from each of the cylindrical portions. In the method, each of the slips may have a first orientation of the filaments at a first end of the slip and may have a second orientation of the filaments at a second end of the slip opposing the first end. In the method, the first orientation and the second orientation may run at different angles with respect to an outer surface of the slip. In the method, the first orientation may be substantially parallel to the outer surface of the slip. In the method, the outer surface of the slip may be enabled to engage an inner surface of a wellbore to secure a downhole assembly including the slip in the wellbore.

In any of the disclosed implementations of the method, winding the prepregnated filament may further include winding the prepregnated filament to a thickness corresponding to a desired thickness of the slip.

In any of the disclosed implementations of the method, winding the prepregnated filament may further include winding the prepregnated filament at an angle $\beta$ with respect to a rotational axis of the base tube.

In any of the disclosed implementations of the method, winding the prepregnated filament may further include winding the prepregnated filament using a specified tension.

In any of the disclosed implementations of the method, the specified tension may depend upon a material composition of the filament.

In any of the disclosed implementations of the method, the filament may include glass.

In any of the disclosed implementations, the method may further include prepregnating the filament with an epoxy resin.

In any of the disclosed implementations of the method, prepregnating the filament may further include selecting a diameter of the filament to achieve a desired compositional ratio of an epoxy resin phase to a filament phase in the slip.

In any of the disclosed implementations of the method, prepregnating the filament may further include applying a prepregnating loading of the epoxy resin on the filament to achieve a desired compositional ratio of an epoxy resin phase to a filament phase in the slip.

In still a further aspect, a filament-reinforced composite part is disclosed. The filament-reinforced composite part may include a matrix phase comprising a cross-linked polymer, and an inclusion phase comprising a plurality of filaments having a first orientation at a first end of the part and having a second orientation at a second end of the part opposing the first end. In the filament-reinforced composite part, the first orientation and the second orientation may run at different angles with respect to an outer surface of the part. In the filament-reinforced composite part, the first orientation may be substantially parallel to the outer surface of the part.

In any of the disclosed implementations of the filament-reinforced composite part, the second orientation may be transverse to a mechanical load subjected to the part. In any of the disclosed implementations of the filament-reinforced composite part, the second orientation may be perpendicular to the loading direction.

In any of the disclosed implementations of the filament-reinforced composite part, the second orientation may be at a defined angle that is not parallel to a mechanical load subjected to the part.

In any of the disclosed implementations of the filament-reinforced composite part, the part may be a slip in a downhole assembly.

In any of the disclosed implementations of the filament-reinforced composite part, the downhole assembly may be a frac plug. In any of the disclosed implementations of the filament-reinforced composite part, the downhole assembly may be a bridge plug.

In any of the disclosed implementations, the filament-reinforced composite part may further include a transition region in the part in which the filaments change orientation from the first orientation to the second orientation.

In any of the disclosed implementations of the filament-reinforced composite part, the second orientation may be defined by an angle $\alpha$ with respect to the outer surface.

In any of the disclosed implementations of the filament-reinforced composite part, the cross-linked polymer may include an epoxy resin and the filament may comprise glass.

In any of the disclosed implementations of the filament-reinforced composite part, a diameter of the filament may be selected to determine a compositional ratio between the matrix phase and the inclusion phase.

In any of the disclosed implementations of the filament-reinforced composite part, a prepregnation loading of the filament with the cross-linked polymer may be selected to determine a compositional ratio between the matrix phase and the inclusion phase.

In any of the disclosed implementations of the filament-reinforced composite part, the part may be cut from a specialized filament wound tube that is wound using a prepregnated filament. In the filament-reinforced composite part, the prepregnated filament may be wound at an angle $\beta$.

In any of the disclosed implementations of the filament-reinforced composite part, the filaments in the part may be under tension.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted above, fiber-reinforced composite materials have been developed for various engineering applications where improvements in mechanical properties are desired. Typically in a fiber-reinforced polymer material, a polymer matrix may be combined with a relatively stiff or hard fiber that is added in a particular form-factor to achieve desired results. For example, a polymer material such as an epoxy resin (also referred to as a polyeoxide) is often used as the matrix phase. The epoxy resin may be formulated as a blend with various co-polymers, additives, or fillers in particular implementations, to achieve varying physical, mechanical, thermal, electronic, or chemical properties. Furthermore, the epoxy resin may be cross-linked, such as by catalytic homopolymerization, or by using any of a variety of additional cross-linking agents, such as amines, acids, acid anhydrides, phenols, alcohols, thiols, among others. The cross-linking agents may be used as a hardener or a curing agent to induce the cross-linking reaction in the base matrix phase that is typically a viscous or semi-viscous liquid. The cross-linking reaction is often referred to as "curing" or "setting" of the epoxy resin that results in a thermosetting polymer that may have desirable physical, mechanical, thermal, electronic, or chemical properties, or any combination thereof.

For the fiber inclusion phase in a fiber-reinforced composite material, various sizes, orientations, and compositional types of fibers may be used. The fiber material may comprise metal, ceramics, polymers, or glasses, in different implementations and depending on the desired properties of the fiber-reinforced composite. When a fiber-reinforced polymer is designed to withstand isotropic mechanical loads, relatively short fibers having a random orientation may be used to avoid any particular directional strength or directional weakness in the fiber-reinforced polymer. When directional strength is desired, longer fibers may be used and the longer fibers may be aligned along a particular direction, such as dependent on a directional load.

By virtue of the liquid nature of the uncured epoxy resin, many fiber-reinforced composite materials may be formed using a molding operation to form a desired part shape. Molding may be used to capture and surround the inclusion phase by the matrix phase within a mold cavity as the matrix phase made of the epoxy resin cures to final hardness. Thus, molding may be particularly suitable for forming fiber-reinforced composite materials having relative short fibers.

When a filament is used as a substantially continuous source of a fiber as the inclusion phase, various methods may be used to form the fiber-reinforced composite material. In one example, the filaments may be wound into a tube to form a "filament wound tube" that can be used for fluid communication or from which other parts can be produced. The filament wound tube is typically formed by prepregnating a continuous strand of the fiber with the desired matrix composition, such as an epoxy resin. The prepregnated strand of fiber may then be wound around a base tube that supports the inner diameter of the filament wound tube. The winding of the prepregnated fiber may be a continuous operation on a suitable winding fixture or apparatus, and may be economically desirable for this reason. The prepregnated fiber may be wound at a desired winding angle, β, relative to a central axis of the base tube to produce differently oriented composite materials. Typically, filament wound tubes are produced in this manner with a uniform radius and the same composition, orientation, and alignment of the filaments throughout the tube and accordingly having parallel filament windings running through the composite material structure.

For certain applications, individual parts may be cut from a filament wound tube and may be used for particular applications where a fiber-reinforced composite is desired. One such application is a slip in a downhole assembly, such as in a frac plug, which is typically held in place by the slip being forced against the inner surface of the wellbore or items in a wellbore (often a casing, see also FIGS. 2A, 2B) when the frac plug is set. The frac plug may be set by compressing the frac plug at the desired plug location in the wellbore, causing a cone to force the slip in place with a relatively large setting force. The setting force of the cone represents a mechanical load experienced by the slip and which the slip is designed to withstand. Therefore, a larger mechanical strength of the slip under such loading conditions is highly desirable, in order to increase the performance of the frac plug incorporating the slip, or another type of plug, such as a bridge plug that may also incorporate the slip.

As will be described in further detail, a filament-reinforced composite material with load-aligned filament windings is disclosed. The filament-reinforced composite material with load-aligned filament windings is described herein in an exemplary application for forming a slip for use in a frac plug or a bridge plug. The filament-reinforced composite material with load-aligned filament windings disclosed herein may be formed as a specialized filament wound tube having different diameter sections over a correspondingly segmented mandrel. The specialized filament wound tube may be cut into cylindrical portions corresponding to the segments of the mandrel to enable release of the cylindrical portions from the segmented mandrel, while the slip made from the filament-reinforced composite material with load-aligned filament windings disclosed herein may be cut from load-aligned filament sections in the respective cylindrical portions. The slip made from the filament-reinforced composite material with load-aligned filament windings disclosed herein may have increased strength specifically under the directional loading conditions experienced in the frac plug or the bridge plug as compared with slips made from conventional filament wound tubes of uniform diameter. The specialized filament wound tube used to make the filament-reinforced composite material with load-aligned filament windings disclosed herein may yield a plurality of individual slip parts and may accordingly represent an industrially efficient approach for manufacturing the slip parts, or other composite parts where load-aligned filament windings are desired.

Figure 1:
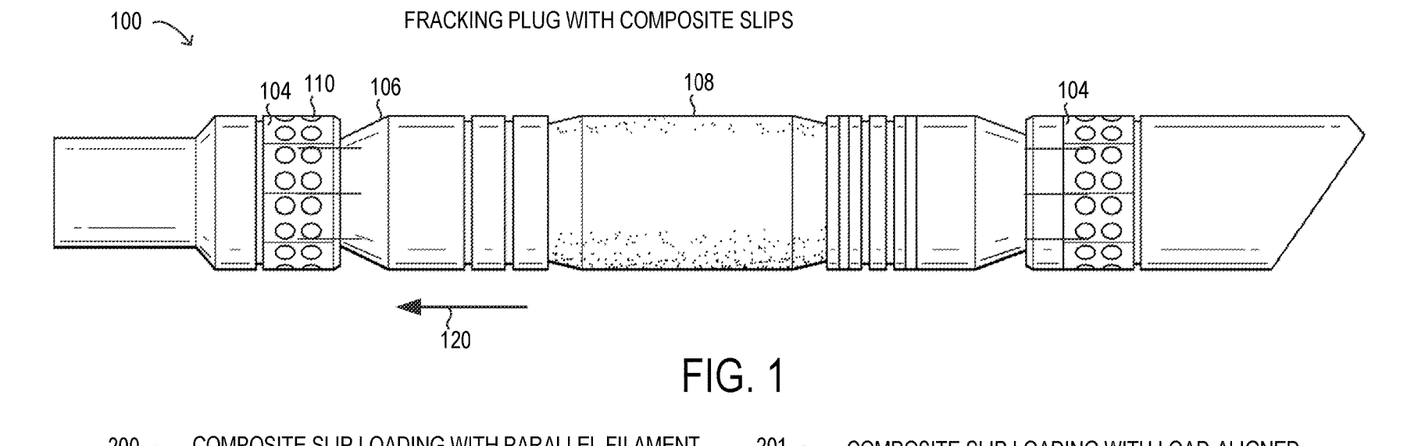
FIG. 1 is a depiction of a frac plug with composite slips.

Referring now to the drawings, FIG. 1 shows a frac plug 100 with composite slips 104. FIG. 1 is a schematic diagram for descriptive purposes and is not drawn to scale or perspective. As used herein, a "composite slip" refers to a slip made from a filament-reinforced polymer composite material. Frac plug 100 may operate to plug a wellbore, such as a cased wellbore having a casing diameter of 3.5 inches, 4 inches, 4.5 inches, or 5.5 inches, among other casing diameters. Frac plug 100 may accordingly include a rubber plug 108 that expands to seal the casing diameter when frac plug 100 is set in place. Frac plug 100 may be set in place by compressing frac plug 100, such that composite slips 104 located at either end of frac plug 100 are engaged to firmly hold frac plug 100 in a particular location in a corresponding wellbore, such as within a casing of the wellbore. The frictional force of composite slips 104 pressing against the interior surface of the wellbore or the wellbore casing holds frac plug 100 in place in the set or "plugged" condition. Accordingly, the force that maintains frac plug 100 in the plugged condition is achieved by virtue of the material strength of composite slips 104. As will be described in further detail, composite slips 104 may be filament-reinforced composite slips with load-aligned filament windings, as disclosed herein.

As shown in FIG. 1, at one end of frac plug 100, a cone 106 is located adjacent to composite slips 104, which may be a plurality of parts arranged axially next to each other and bound together with at least one ring clamp (not shown) prior to downhole introduction and engagement. When cone 106 is forced against composite slips 104 in the direction given by arrow 120 (i.e. the frac plug is compressed), cone 106 works with appreciable force against an inner surface of each individual composite slip 104, initially causing the ring clamp to fail and to release composite slips 104. Because composite slips 104 are nonetheless contained in the downhole setting, composite slips 104 are forced outward to press against the wellbore or the wellbore casing. Also shown are ceramic buttons 110, which may be embedded at an outer surface of composite slips 104 to provide increased friction and hardness to improve the securing of frac plug 100 by composite slips 104.

Although a frac plug 100 is shown incorporating composite slips 104, it will be understood that other types of BHAs, such as bridge plugs, or other tools, may incorporate composite slips 104.

Figure 2A:
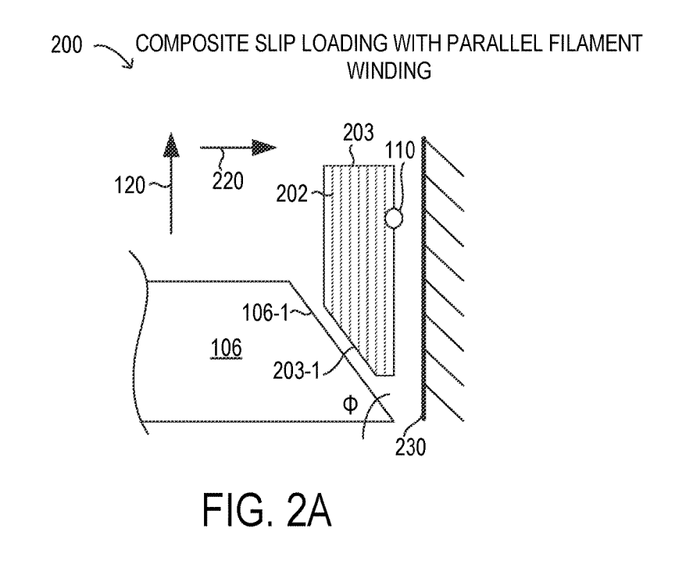
FIG. 2A is a partial sectional view of a composite slip with parallel filament windings.

Referring now to FIG. 2A, a composite slip loading 200 with a parallel filament winding 202 is shown as a cross-sectional schematic diagram. FIG. 2A is a schematic diagram for descriptive purposes and is not drawn to scale or perspective. In FIG. 2A, the operation of cone 106 being forced in direction 120 is illustrated at one side of a wellbore 230. As a result, cone 106 engages a composite slip 203 with appreciable force and causes composite slip 203 to be forced towards wellbore 230 in direction 220. At an outer surface of composite slip 203, a ceramic button 110 may be used to improve engagement of composite slip 203 with wellbore 230, such as by increasing friction or by mechanical deformation of a casing (not shown) installed at wellbore 230. Thus, as cone 106 is engaged when frac plug 100 is set, a cone surface 106-1 may engage with an angled surface 203-1 of composite slip 203, which applies force to composite slip 203 in direction 220.

Figure 4:
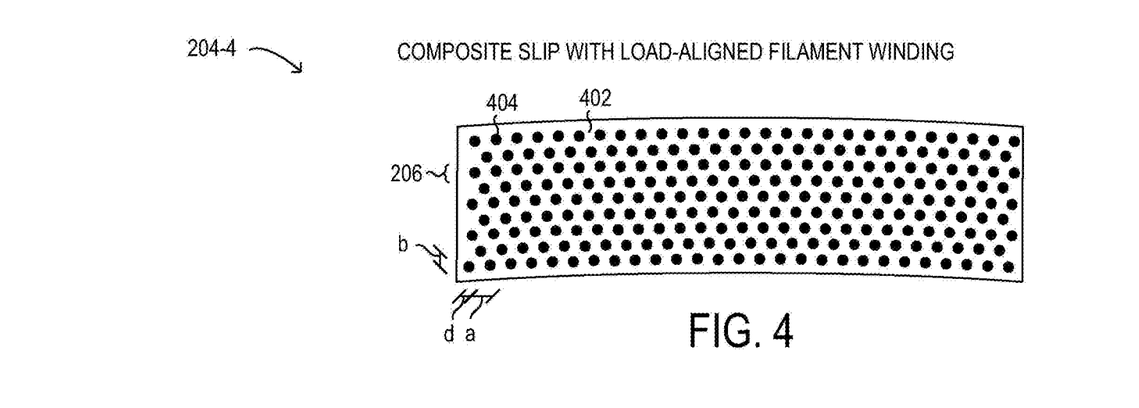
FIG. 4 is a sectional view of a load-aligned filament winding.

Also shown in FIG. 2A are parallel filament windings 202, which represent layers of wound filaments and an orientation of the layers, but does not illustrate individual filaments (see FIG. 4). Because parallel filament windings 202 are aligned with the direction 120 of the mechanical loading (i.e. force vector) by cone 106, parallel filament windings 202 are loaded in an axial direction in composite slip 203, which may result in composite slip 203 having directional strength that varies with the alignment direction of parallel filament windings 202. Thus, mechanical loading from direction 120 may cause parallel filament windings 202 to break apart from the matrix phase, which may result in a lower strength to failure of composite slip 203 as used in frac plug 100 than is desired.

Figure 2B:
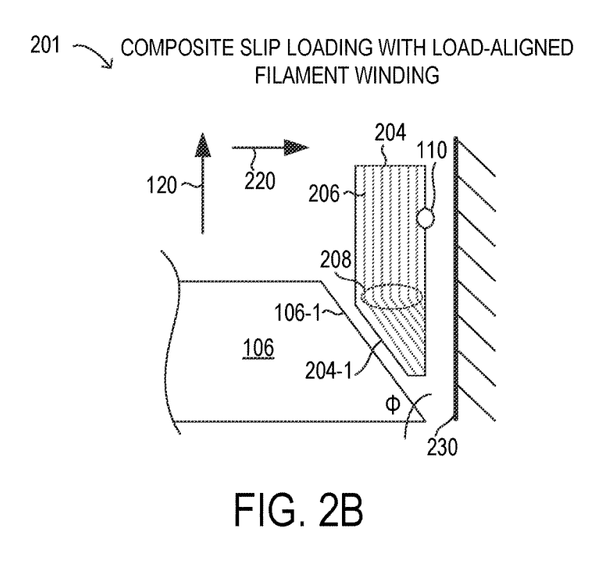
FIG. 2B is a partial sectional view of a composite slip with load-aligned filament windings.

Referring now to FIG. 2B, a composite slip loading 201 with a load-aligned filament winding 202 is shown as a cross-sectional schematic diagram. FIG. 2B is a schematic diagram for descriptive purposes and is not drawn to scale or perspective. In FIG. 2B, the operation of cone 106 being forced in direction 120 is illustrated at one side of a wellbore 230. As a result, cone 106 engages composite slip 204 with appreciable force and causes composite slip 204 to be forced towards wellbore 230 in direction 220. Composite slip 204 may represent an instance of composite slip 104 shown in FIG. 1. At an outer surface of composite slip 204, a ceramic button 110 may be used to improve engagement of composite slip 204 with wellbore 230, such as by increasing friction or by mechanical deformation of a casing (not shown) installed at wellbore 230. Thus, as cone 106 is engaged when frac plug 100 is set, a cone surface 106-1 may engage with an angled surface 204-1 of composite slip 104, which applies force to composite slip 204 in direction 220.

Also shown in FIG. 2B are load-aligned filament windings 206, which represent layers of wound filaments and an orientation of the layers, but does not illustrate individual filaments (see FIG. 4). Load-aligned filament windings 206 are aligned at a first end of composite slip 204 in a first orientation, and are aligned at an opposing end of composite slip 204 in a second orientation. Also visible in FIG. 2B is a transition region 208 of composite slip 204 in which the first orientation changes to the second orientation within composite slip 204. As shown, the first orientation is aligned substantially parallel with the direction 120 of the mechanical loading (i.e. force vector) by cone 106. However, composite slip 204 engages with cone 106 at a second end of composite slip 204, at surface 204-1, where load-aligned filament windings 206 are aligned for optimized performance with respect to the mechanical load from cone 106 in direction 120. Specifically, the second orientation at surface 204-1 has load-aligned filament windings 206 running at an angle (i.e., non-parallel) with respect to direction 120 because load-aligned filament windings 206 exhibit greater strength for the non-parallel loading. For example, it has been observed that composite slip 104 may have a strength to failure of about 2,000 pounds per square inch (psi) in a 5.5 inch casing test, while composite slip 204 may have a strength to failure of about 7,350 psi under the same conditions, which is more than a 300% improvement in strength to failure. As a comparison, a molded composite slip with randomly oriented ½ inch glass fibers may have a strength to failure of 4,100 psi under the same conditions, which indicates that at least some of the randomly oriented fibers provide additional strength.

As shown in FIG. 2B, filament layers 206 run through transition region 208 within composite slip 204 in which filament windings 206 change from the first orientation (substantially parallel) to the second orientation (substantially non-parallel). Transition region 208 shows where filament layers 206, which may be formed using a continuous filament strand, change directions. It will be understood that the transition region may be formed to change directions with varying radii of curvature, in different implementations, from a relatively sharp transition to a smoother transition, as desired.

Figure 3:
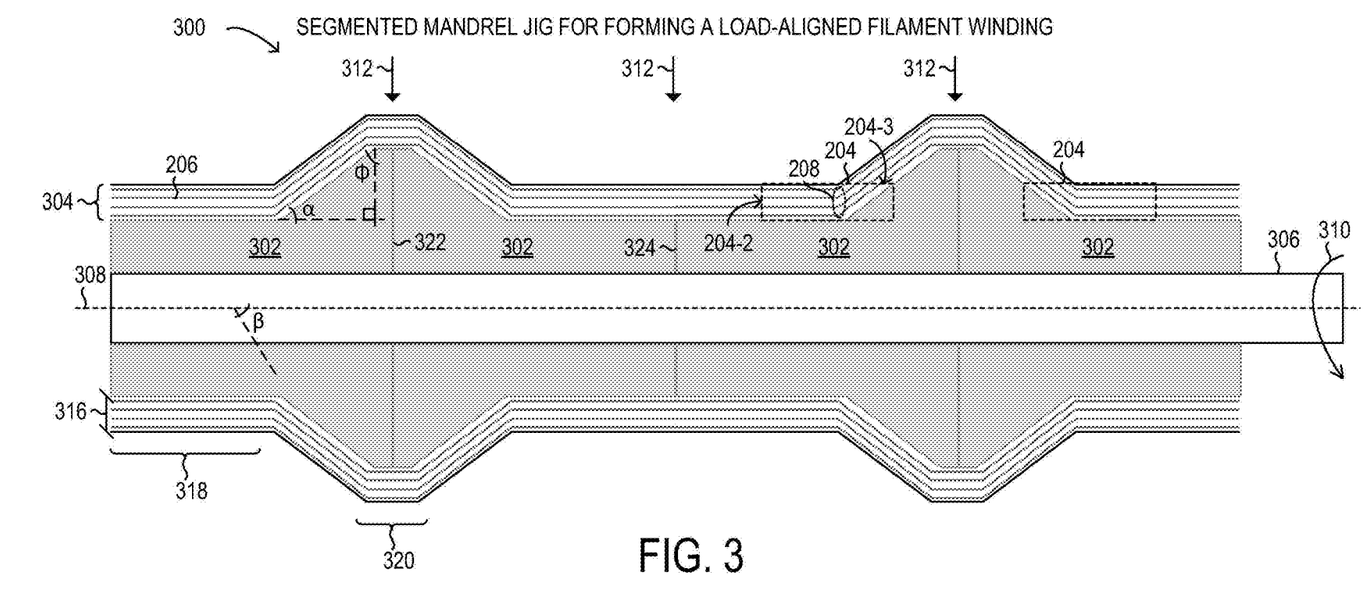
FIG. 3 is a sectional view of a segmented mandrel forming a load-aligned filament winding.

Referring now to FIG. 3, a segmented mandrel jig 300 for forming a load aligned filament winding is shown as a cross-sectional schematic diagram. FIG. 3 is a schematic diagram for descriptive purposes and is not drawn to scale or perspective. In FIG. 3, a rotational axis 308 of segmented mandrel jig 300 represents a center line of symmetry about which segmented mandrel jig 300 may be rotated in an angular direction 310 (or the reverse angular direction) for winding filament layers 206.

Figure 5:
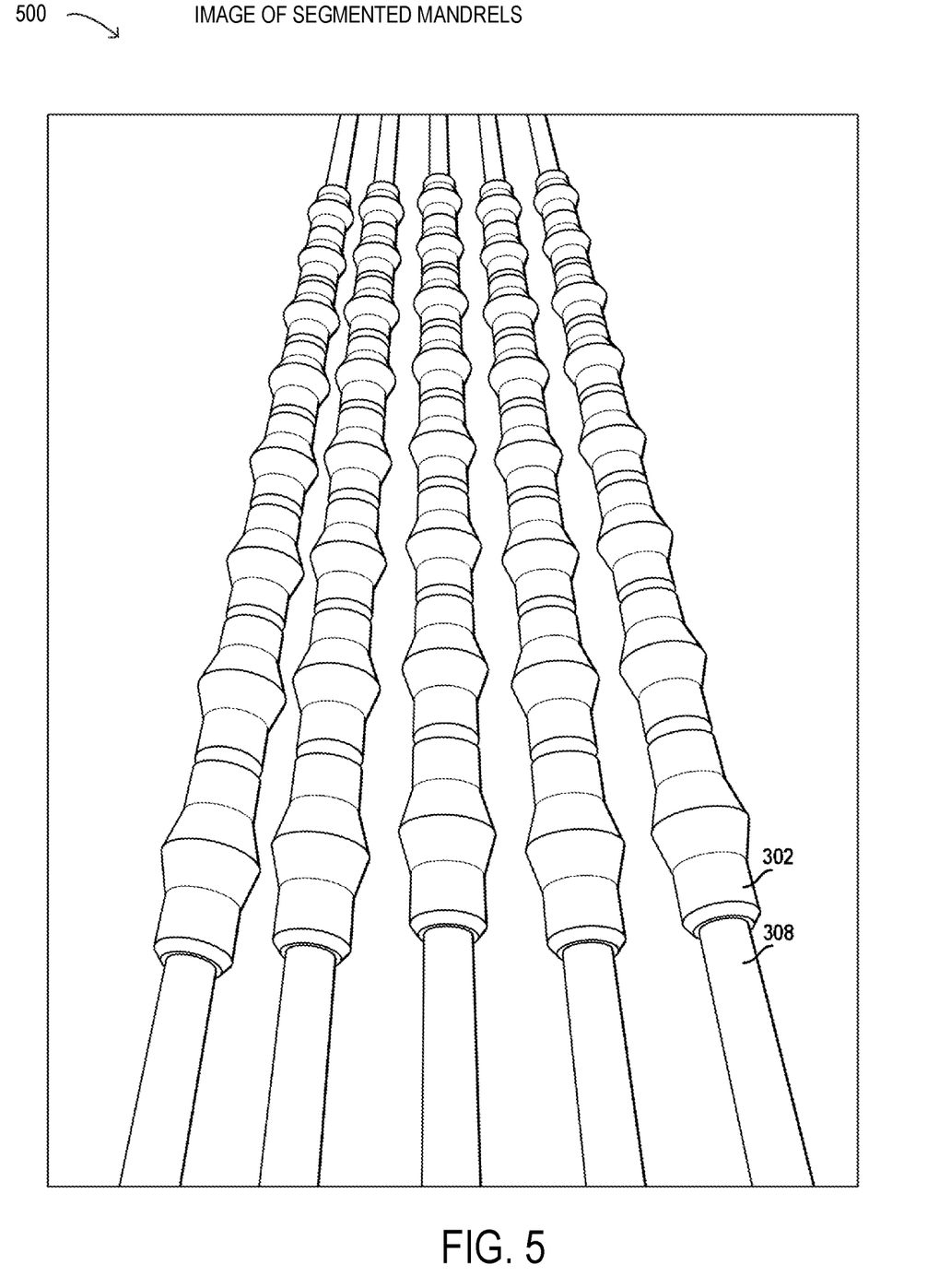
FIG. 5 is an image of segmented mandrels.

As shown in FIG. 3, a plurality of segmented mandrels 302 are mounted over a base tube 308 (see also FIG. 5). Segmented mandrels 302 are hollow cylindrical parts that have an inner diameter corresponding to an outer diameter of base tube 308, and can accordingly be penetrated by base tube 308 to form segmented mandrel jig 300. Each of the segmented mandrels 302 has a smaller diameter portion 318 at a first end, and a larger diameter portion 320 at a second end opposite the first end, and a transitional region between the smaller diameter portion 318 and the larger diameter portion 320 that forms a conical increase in diameter. The segmented mandrels 302 are further successively mounted over base tube 308 in a reversed orientation such that the small diameters and the large diameters of adjacent segmented mandrels 302 respectively meet to form a substantially contiguous outer surface. Although surface 322, 324 is shown as linear between adjacent segmented mandrels 302, it will be understood that segmented mandrels 302 may be formed to mate with each other through interlocking profiles of surfaces 322 and 324 to improve mechanical stability of segmented mandrel jig 300. Accordingly, each segmented mandrel 302 may not be identical in some implementations.

In FIG. 3, once segmented mandrels 302 have been assembled on base tube 308, base tube 308 may be installed in a winding machine enabling segmented mandrel jig 300 to be rotated. Although four segmented mandrels 302 are shown for descriptive simplicity in FIG. 3, it will be understood that larger numbers of mandrels may be used in different implementations of segmented mandrel jig 300 (see FIG. 5). As segmented mandrel jig 300 is rotated in angular direction 310, a continuous filament (not shown) may be wound onto segmented mandrels 302 to form filament layers 206. Specifically, the continuous filament may be prepregnated prior to winding to introduce the matrix phase to form the filament-reinforced composite material. A prepregnation loading of the continuous filament using a suitable thermosetting polymer, such as an epoxy resin, among others, may be used to modulate an amount of the matrix phase. For example, the continuous filament may be formed with a plurality of micro strands and accordingly have a high surface area for enabling adhesion of various amounts of the thermosetting polymer during prepregnation of the filament. Thus during winding, both the matrix phase and the inclusion phase in the form of the filament itself are introduced by forming filament layers 206.

As shown in FIG. 3, winding of filament layers 206 may be done at an angle β with respect to rotational axis 308. In FIG. 3, filament layers 206 are shown as a line that schematically represents a plurality of filament layers 206 and, in particular, shows an orientation of filament layers 206. However, filament layers 206 in FIG. 3 do not show individual filaments or a relationship between individual filaments and the matrix phase (see FIG. 4). Additionally, winding of filament layers 206 may be performed under tension applied to the continuous prepregnated filament. The tension applied to the filament during winding may create residual stresses in the composite material that can improve strength to failure in some instances. Accordingly, the level of tension applied to the filament during winding may depend on various factors, such as a composition of the filament, a linear density of the filaments, a composition of the matrix phase, a diameter of the filaments, among other factors.

As shown in FIG. 3, the transitional sections of segmented mandrels 302 may have a conical incline at an angle α with respect to rotational axis 308. As shown by the right triangle in FIG. 3, angle α may be supplementary to cone angle φ shown in FIGS. 2A and 2B, such that segmented mandrels 302 correspond to cone 106 in geometry.

In FIG. 3, winding of filament layers 206 may proceed until a specified thickness 316 is uniformly attained over an entire surface of segmented mandrel jig 300 to form a specialized filament wound tube 304. Specialized filament wound tube 304 has alternating sections of smaller diameter portions 318 and larger diameter portions 320. After winding of filament layers 206, specialized filament wound tube 304 may be cured, such as by thermosetting or by another curing process. Curing may involve shrinkage, changes in density, and may result in a final value for thickness 316.

After curing of specialized filament wound tube 304, specialized filament wound tube 304 may be radially cut at locations 312 where adjacent segmented mandrels 302 meet in segmented mandrel jig 300. As a result, individual cylindrical portions of specialized filament wound tube 304 attached to respective segmented mandrels 302 may be individually separated. Then, each cylindrical portion of specialized filament wound tube 304 may be released from a respective segmented mandrel 302. From each cylindrical portion, a plurality of composite slips 204 may be sectioned as shown in FIG. 3. Each composite slip 204 has a first orientation of filament layers 206 at a first end 204-2 and a second orientation of filament layers 206 at a second end 204-3 opposite the first end, separated by transition region 208 that is formed using segmented mandrels 302, as shown in FIG. 3. After further finishing steps and optional installation of ceramic buttons, composite slips 204 may be assembled into frac plug 100 or another device, such as a bridge plug (not shown). In particular, it is noted that the outer diameter of segmented mandrel 302 corresponds to an inner contour of composite slip 204

Although segmented mandrel jig 300 is described above for the purpose of forming composite slips 204, it will be understood that segmented mandrel jig 300 may be used to form various composite material parts having a filament-reinforced composite material with load-aligned filament windings. For example, different parts with different orientations may be cut from specialized filament wound tube 304, in various implementations. Furthermore, although a certain dimensional size and ratio are depicted for composite slips 204, it will be understood that various dimensional parameters may be varied in different implementations. For example, for a given performance (or strength to failure) a length of composite slip 204, or a minimum length, may be determined, since the length may depend upon performance. Therefore, since composite slip 204 has increased strength due to the load-aligned filament windings 206, a smaller length may be selected for composite slip 204 to achieve the same performance, with other factors being equal, which may also be economically advantageous.

Referring now to FIG. 4, a sectional view 104-4 of a composite slip with load-aligned filament windings is shown. FIG. 4 is a schematic diagram for descriptive purposes and is not drawn to scale or perspective. Sectional view 104-4 may correspond to a cross-section at first end 204-2 taken at an angle β, such that filaments 404 shown in FIG. 4 appear normal to the surface. It will be understood that angle β may be selected in particular implementations such that $90°<β<0°$ or that $90°<<β<<0°$. Also, in FIG. 4, filament layer 206 shown previously in FIGS. 2B and 3 may correspond to one or more rows of filaments 404 shown individually.

In FIG. 4, a composition of the composite material may be defined by relative fractions of a matrix phase 402 surrounded by filaments 404, as described previously. For example, a filament diameter d along with a filament spacing a may be used to define a linear density of filaments 404, while a row spacing b may additional define a bulk density of rows of filaments 404. Specifically, as the values of a and b approach the value of d, a relative fraction of matrix phase 402 may be reduced, as spacing between individual filaments 404 is reduced. In another example, as a prepregnation loading of matrix phase 402 of the continuous filament during winding is increased, the values of a and b may increase, as a relative amount of matrix phase 402 is increased. It has been observed that certain values of a, b, and d result in improved performance of composite slip 204, for example a diameter of the filament may be about 0.1 mm, 0.5 mm, or less than 1 mm, in various implementations. Values of b and d may be about 0.5 mm, 1.0 mm, 2.0 mm or less than 3.0 mm in various implementations.

Referring now to FIG. 5, an image 500 of segmented mandrels 302 mounted onto corresponding base tubes 308 is shown. Image 500 is a photograph of 5 base tubes 308, each having 16 segmented mandrels 302 mounted thereon. As shown in image 500, the base tubes 308 with the segmented mandrels 302 mounted thereon are ready for installation in a winding machine to receive the prepregnated continuous filament, as described previously. It will be understood that various process parameters, sizes, and compositions for forming load-aligned filament windings 206 may be used in different implementations.

Figure 6:
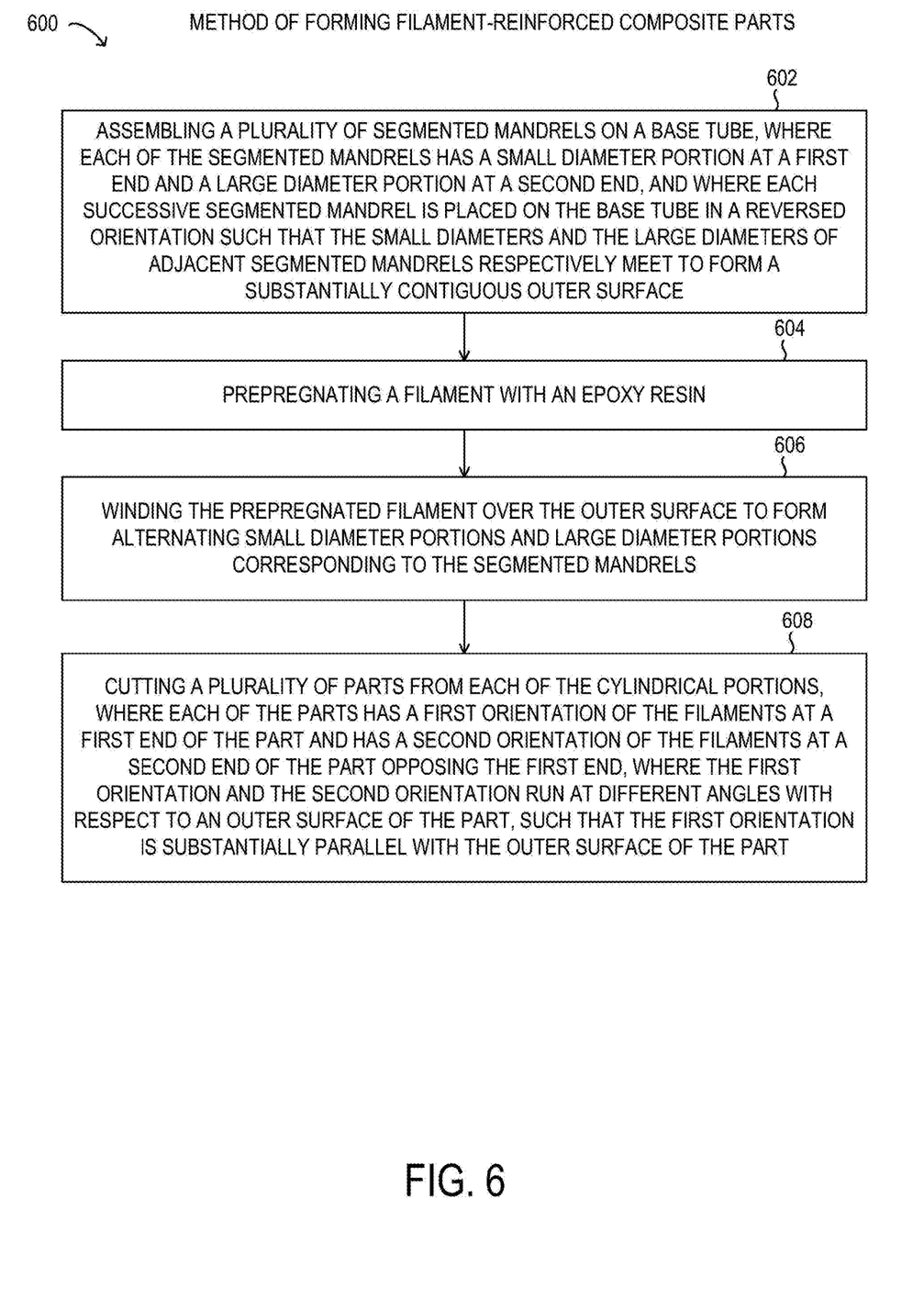
FIG. 6 is a flow chart of a method for forming a composite slip with load-aligned filament windings.

Referring now to FIG. 6, a flow chart of selected elements of an embodiment of a method 600 of forming filament-reinforced composite parts, as disclosed herein. It is noted that certain operations described in method 600 may be optional or may be rearranged in different embodiments. In various embodiments, the parts formed using method 600 may be slips for use in a frac plug or a bridge plug, as described herein.

Method 600 may begin at step 602 by assembling a plurality of segmented mandrels on a base tube, where each of the segmented mandrels has a small diameter portion at a first end and a large diameter portion at a second end, and where each successive segmented mandrel is placed on the base tube in a reversed orientation such that the small diameters and the large diameters of adjacent segmented mandrels respectively meet to form a substantially contiguous outer surface. At step 604, a filament is prepregnated with an epoxy resin. The filament may comprise glass or a plurality of glass fibers. At step 606, the prepregnated filament is wound over the outer surface to form alternating small diameter portions and large diameter portions corresponding to the segmented mandrels. At step 608, a plurality of parts from each of the cylindrical portions is cut, where each of the parts has a first orientation of the filaments at a first end of the part and has a second orientation of the filaments at a second end of the part opposing the first end, where the first orientation and the second orientation run at different angles with respect to an outer surface of the part, such that the first orientation is substantially parallel with the outer surface of the part.

The above disclosed subject matter is to be considered illustrative, and not restrictive, and the appended claims are intended to include all such modifications, enhancements, and other embodiments thereof which fall within the true spirit and scope of the present disclosure.

What is claimed is:

1. A filament-reinforced composite slip, comprising:
a matrix phase comprising a cross-linked polymer;
an inclusion phase comprising filaments having a first orientation at a first end of the slip and having a second orientation at a second end of the slip opposing the first end, wherein the first orientation and the second orientation run at different angles with respect to an outer surface of the slip;
wherein the first orientation is substantially parallel to the outer surface of the slip at the first end;
wherein the filaments terminate in the outer surface of the slip at the second end; and
wherein the outer surface of the slip is enabled to engage an inner surface of a wellbore to secure a downhole assembly in the wellbore.

2. The filament-reinforced composite slip of claim 1, wherein the second orientation is transverse to a loading direction experienced by the slip.

3. The filament-reinforced composite slip of claim 2, wherein the second orientation is perpendicular to the loading direction.

4. The filament-reinforced composite slip of claim 1, wherein the second orientation is at a defined angle that is not parallel to a loading direction experienced by the slip.

5. The filament-reinforced composite slip of claim 1, wherein the downhole assembly is a frac plug.

6. The filament-reinforced composite slip of claim 1, wherein the downhole assembly is a bridge plug.

7. The filament-reinforced composite slip of claim 1, further comprising:
a transition region in the slip in which the filaments change orientation from the first orientation to the second orientation.

8. The filament-reinforced composite slip of claim 1, wherein the second orientation is defined by an angle α with respect to the outer surface of the slip at the first end.

9. The filament-reinforced composite slip of claim 8, wherein a cone in the downhole assembly engages the slip at a cone angle φ, and wherein the angle α is supplementary to the cone angle φ.

10. The filament-reinforced composite slip of claim 9, further comprising:
an angled surface at the second end, wherein the angled surface is substantially parallel to the second orientation, and wherein the cone engages the slip at least at a portion of the angled surface.

11. The filament-reinforced composite slip of claim 1, wherein the cross-linked polymer comprises an epoxy resin and the filament comprises glass.

12. The filament-reinforced composite slip of claim 1, wherein a diameter of the filament is selected to achieve a desired compositional ratio between the matrix phase and the inclusion phase.

13. The filament-reinforced composite slip of claim 1, wherein a prepregnation loading of the filament with the cross-linked polymer is selected to achieve a desired compositional ratio between the matrix phase and the inclusion phase.

14. The filament-reinforced composite slip of claim 1, wherein the slip is cut from a specialized filament wound tube that is wound using a prepregnated filament.

15. The filament-reinforced composite slip of claim 14, wherein the prepregnated filament is wound at an angle β.

16. The filament-reinforced composite slip of claim 1, wherein the filaments in the slip are under tension.

* * * * *